(12) United States Patent
Soika et al.

(10) Patent No.: US 7,080,696 B2
(45) Date of Patent: Jul. 25, 2006

(54) MOTOR MOUNTING AND SEALING ARRANGEMENT FOR A POWER TOOL

(75) Inventors: Martin Soika, Idstein (DE); Rainer Herting, Langenhan (DE)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 10/767,252

(22) Filed: Jan. 29, 2004

(65) Prior Publication Data

US 2004/0211575 A1 Oct. 28, 2004

(30) Foreign Application Priority Data

Jan. 31, 2003 (GB) ................... 0302206.8

(51) Int. Cl.
*E21B 4/04* (2006.01)
*E21B 6/02* (2006.01)

(52) U.S. Cl. .................. 173/216; 173/93.5; 310/47

(58) Field of Classification Search .................. 173/93, 173/93.5, 216; 277/549, 572, 573; 310/47, 310/85, 89, 90, 91
See application file for complete search history.

(56) References Cited

U.S. PATENT DOCUMENTS

| 1,145,516 | A |   | 7/1915 | Schmid-Roost |
|---|---|---|---|---|
| 3,892,986 | A |   | 7/1975 | Allen |
| 3,997,805 | A | * | 12/1976 | Dochterman ................ 310/90 |
| 4,183,414 | A | * | 1/1980 | Tamai et al. ................ 173/118 |
| 4,519,617 | A | * | 5/1985 | Butler ........................ 277/550 |
| 4,945,271 | A |   | 7/1990 | Yokoya et al. |
| 5,185,544 | A |   | 2/1993 | Takada |
| 5,576,586 | A |   | 11/1996 | Blumenberg |
| 5,619,082 | A |   | 4/1997 | Choi |
| 5,650,676 | A |   | 7/1997 | Blumenberg |
| 5,801,467 | A |   | 9/1998 | Volz et al. |
| 6,176,321 | B1 | * | 1/2001 | Arakawa et al. .............. 173/48 |
| 6,198,189 | B1 |   | 3/2001 | Takahashi et al. |
| 6,550,780 | B1 | * | 4/2003 | DeLeeuw et al. ........... 277/549 |

FOREIGN PATENT DOCUMENTS

DE 199 13 020 A1 10/2000
EP 0 489 277 A1 6/1992

* cited by examiner

*Primary Examiner*—Rinaldi I. Rada
*Assistant Examiner*—Nathaniel Chukwurah
(74) *Attorney, Agent, or Firm*—Michael P. Leary; Charles E. Yocum; Adan Ayala

(57) ABSTRACT

A hand held electrical tool includes a gear casing for housing a drive mechanism, which gear casing comprises an entrance. The tool's motor includes an armature shaft having an end at which a pinion is formed for engaging the drive mechanism. A motor plate having a central opening fixes the gear casing with respect to the motor and is mounted around the armature shaft adjacent said pinion end and a shaft bearing is located between the motor plate and the pinion. The pinion and bearing are received in the entrance to the gear casing. A moulded on resilient sealing ring is located around the central opinion through the motor plate for sealing between the motor plate and the armature shaft and a moulded on resilient O-ring is located on the face of the motor plate facing the bearing for engaging the outer race of said bearing.

16 Claims, 4 Drawing Sheets

MOTOR MOUNTING AND SEALING ARRANGEMENT FOR A POWER TOOL

The present invention relates to hand held tools powered by an electric motor, and in particular to a motor mounting and sealing arrangement for drilling and/or hammering tools.

BACKGROUND OF THE INVENTION

In such tools an electric motor may be used for providing a rotary drive to a spindle drive mechanism for rotatingly driving a tool and/or bit of the tool and/or for providing a reciprocating drive to a hammer drive mechanism for providing repeated impacts to the tool and/or bit. The motor may be assembled as a motor sub-assembly in a housing portion, with for example, a motor cooling fan. The motor sub-assembly may then be fixed with respect to a gear casing portion of the tool which may house the spindle drive mechanism and/or hammer drive mechanism of the tool. The arrangement for fixing the motor with respect to the gear casing will need to be robust, should enable efficient rotary drive transmission between an armature shaft of the motor to the drive mechanisms of the tool, should provide adequate sealing of the gear casing to prevent ingress of dust, for example from a motor cooling airflow and should provide adequate fixing of a bearing of the armature shaft with respect to the gear casing.

Traditionally separate components may be used for providing the multiple functions described above, which may lead to a fairly complex arrangement of components and may lead to a relatively complex assembly process for assembling the motor sub-assembly with respect to the gear casing sub-assembly.

BRIEF SUMMARY OF THE INVENTION

The present invention aims to provide a hand held electrically powered tool in which the fixing of the motor sub-assembly with respect to the gear casing is simplified, both in terms of the components used and of the assembly process required.

According to a first aspect of the present invention there is provided a hand held electrically powered tool, comprising:

a gear casing for housing a drive mechanism of the tool, which gear casing comprises an entrance;

a motor including an armature sub-assembly comprising an armature shaft having a first end at which a pinion is formed for engaging the drive mechanism, a motor plate having a central opening mounted around the armature shaft adjacent said first end and a first armature shaft bearing located between the motor plate and the pinion, wherein said pinion and bearing are received in said entrance;

characterized in that a moulded on resilient sealing ring is located around the central opening through the motor plate for sealing between the motor plate and the armature shaft and a moulded on resilient O-ring is located on the face of the motor plate facing the bearing for engaging the outer race of said bearing.

According to a second aspect of the present invention there is provided an armature sub-assembly for a motor of a hand held electrically powered tool comprising an armature shaft having a first end at which a pinion is formed, a motor plate having a central opening mounted around the armature shaft adjacent said first end and a first armature shaft bearing located between the motor plate and the pinion, characterised in that a moulded on resilient sealing ring is located around the central opening through the motor plate for sealing between the motor plate and the armature shaft and a moulded on resilient O-ring is located on the face of the motor plate facing the bearing for engaging the outer race of said bearing.

By moulding on the seal and O-ring, separate components are not required for the functions of sealing between the motor plate and armature shaft and for the rotational fixing of the outer race of the armature bearing. With fewer components assembly of the tool or sub-assembly is correspondingly simplified. Also, by moulding the rings on, the rings are accurately located in the desired position, which may not always be the case with separately assembled rings.

The motor is housed in a motor housing portion and the motor plate may be sandwiched between the motor housing portion and the bearing when the motor is fixed with respect to the gear casing. In particular, fixing members, such as screws or bolts may pass through receiving holes in the gear casing and the motor housing portion and through recesses in the motor plate for fixing the motor with respect to the gear casing.

According to one embodiment of the present invention, the resilient sealing ring is moulded directly onto the motor plate. In this case the resilient sealing ring may have a first portion which is moulded onto the motor plate and a second portion which depends from the first portion and forms a seal against the armature shaft. The first portion may have an L-shaped radial cross-section so that it can be moulded to the edge of the central hole in the motor plate and a portion of a face of the motor plate adjacent the hole and the second portion may have a V-shaped radial cross-section and may depend from the outside corner of the L-shaped portion so that an end of the V-shaped portion remote from the L-shaped portion bears against the armature shaft. Similarly, the resilient O-ring may be moulded directly onto the motor plate. In this case a single component comprising the motor plate with the resilient ring and O-ring moulded onto it can serve several functions.

In an alternative embodiment, the resilient sealing ring and the resilient O-ring are moulded onto a metal ring which metal ring may be fitted within the central opening of the motor plate. This embodiment has the advantage of it being simpler to mould the moulded on rings onto the metal ring than directly onto the motor plate. However, an additional component, the metal ring, is required and an additional assembly step, the fitting of the metal ring to the motor plate, is also required. The metal ring may have an axially extending portion and the resilient sealing ring may comprise a first portion moulded over the axially extending portion and a second portion depending from the first portion and forming a seal against the armature shaft. In this case, the first portion of the resilient sealing ring may have a U-shaped radial cross-section which may fit over an end of the axially extending portion of the metal ring and the second portion may have a V-shaped radial cross-section and depend from the radially innermost corner of the U-shaped portion. The first portion may help to form a deformable releasable coupling between the metal ring and the motor plate. The metal ring may also have a radially outwardly extending portion or flange and the resilient O-ring may be formed on a face of the radially extending portion.

A fan may be mounted for rotation on the armature shaft and the motor plate may be located adjacent the fan, so that the plate forms part of a chamber for the fan and through holes may be formed in the motor plate which act as inlets to the fan.

When the motor is fixed with respect to the gear casing the resilient O-ring may preferably be supported on its radially outer surface by a surface of the entrance to the gear casing.

BRIEF DESCRIPTION OF THE DRAWINGS

An embodiment of a hammer and an armature sub-assembly according to the present invention will now be described by way of example, with reference to the accompanying drawings, in which.

DETAILED DESCRIPTION OF THE INVENTION

Figure 1:
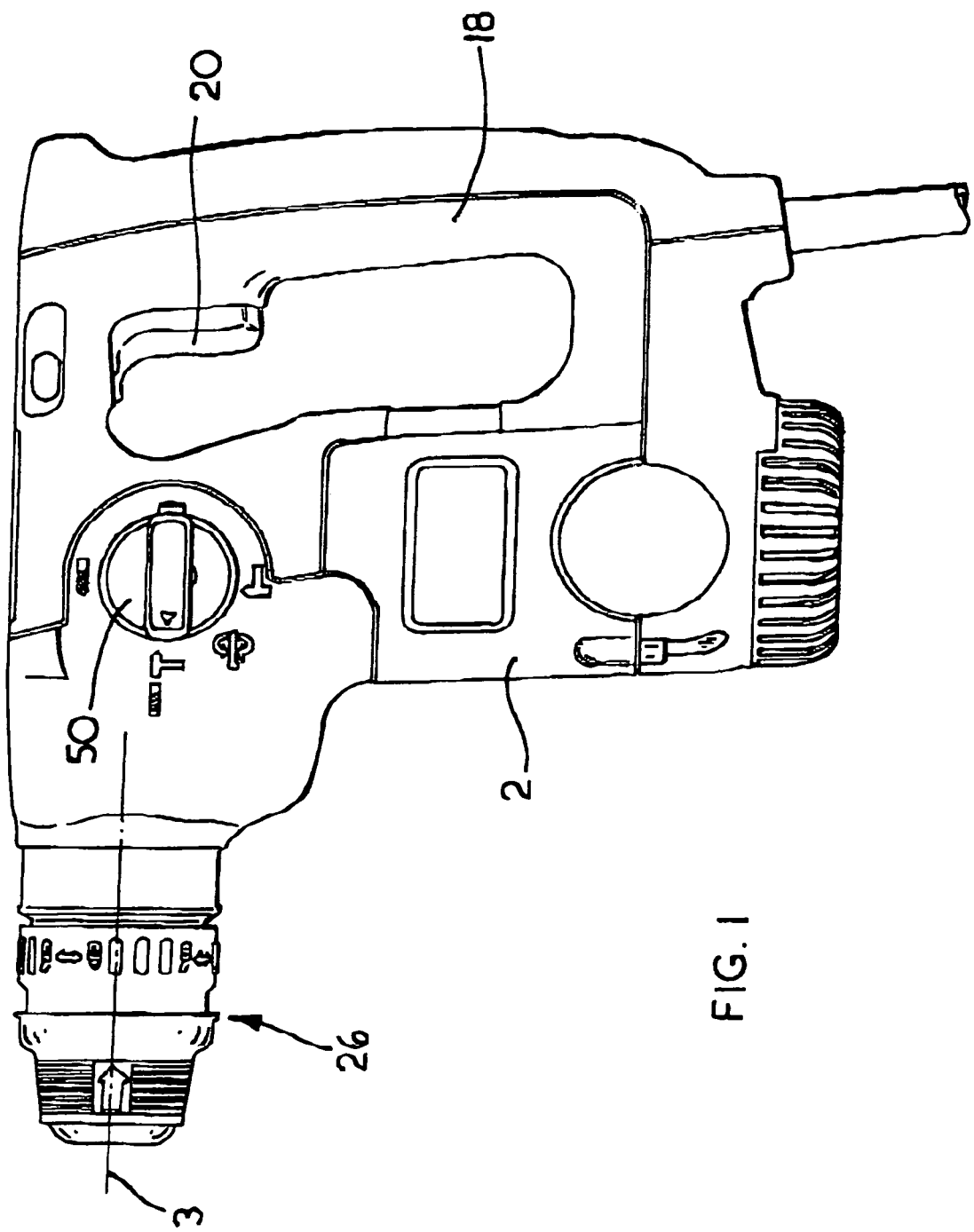
FIG. 1 shows a side view of a rotary hammer according to the present invention.
Figure 2:
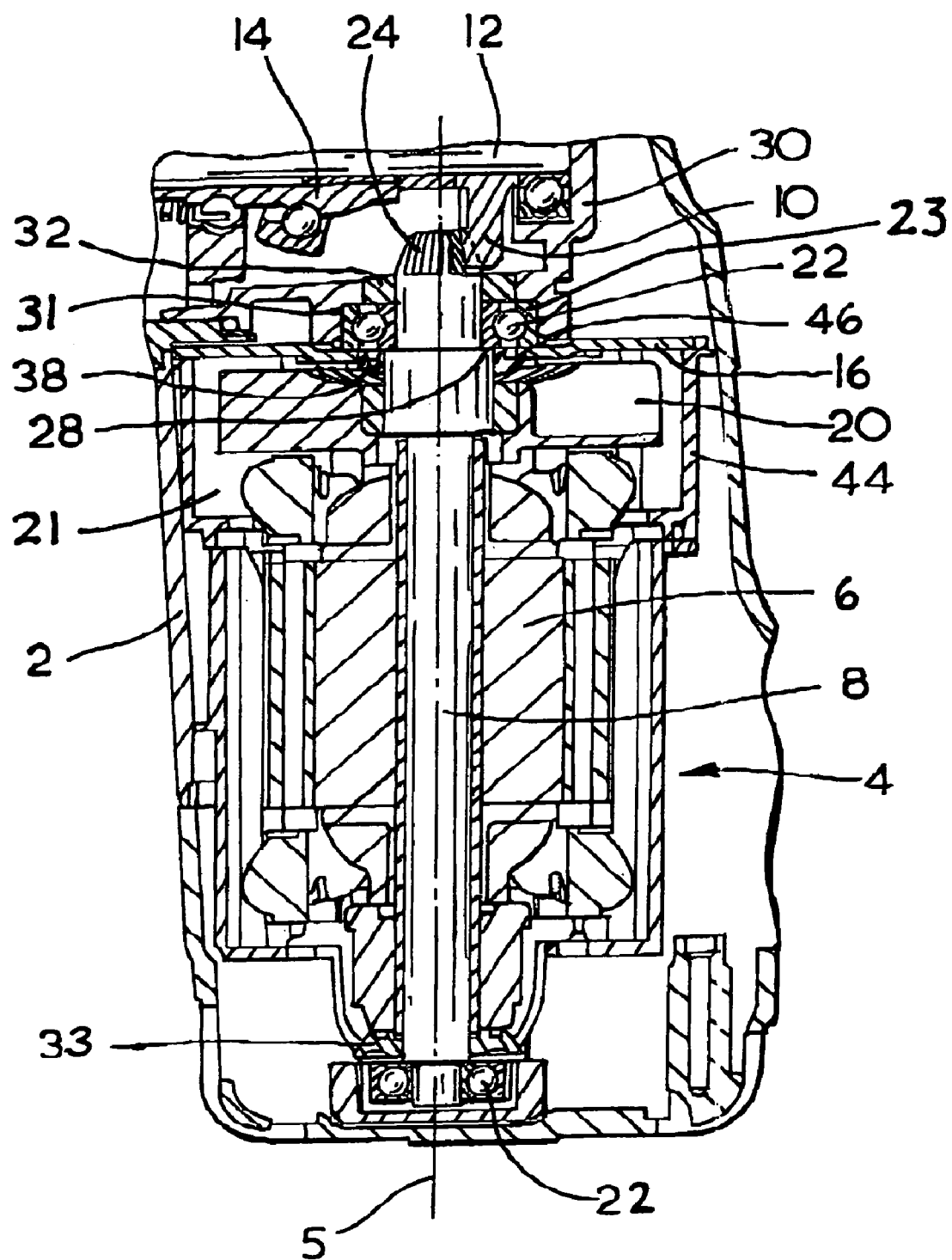
FIG. 2 shows a longitudinal cross-section through the motor housing portion of the hammer of FIG. 1 showing the motor of the hammer.
Figure 3:
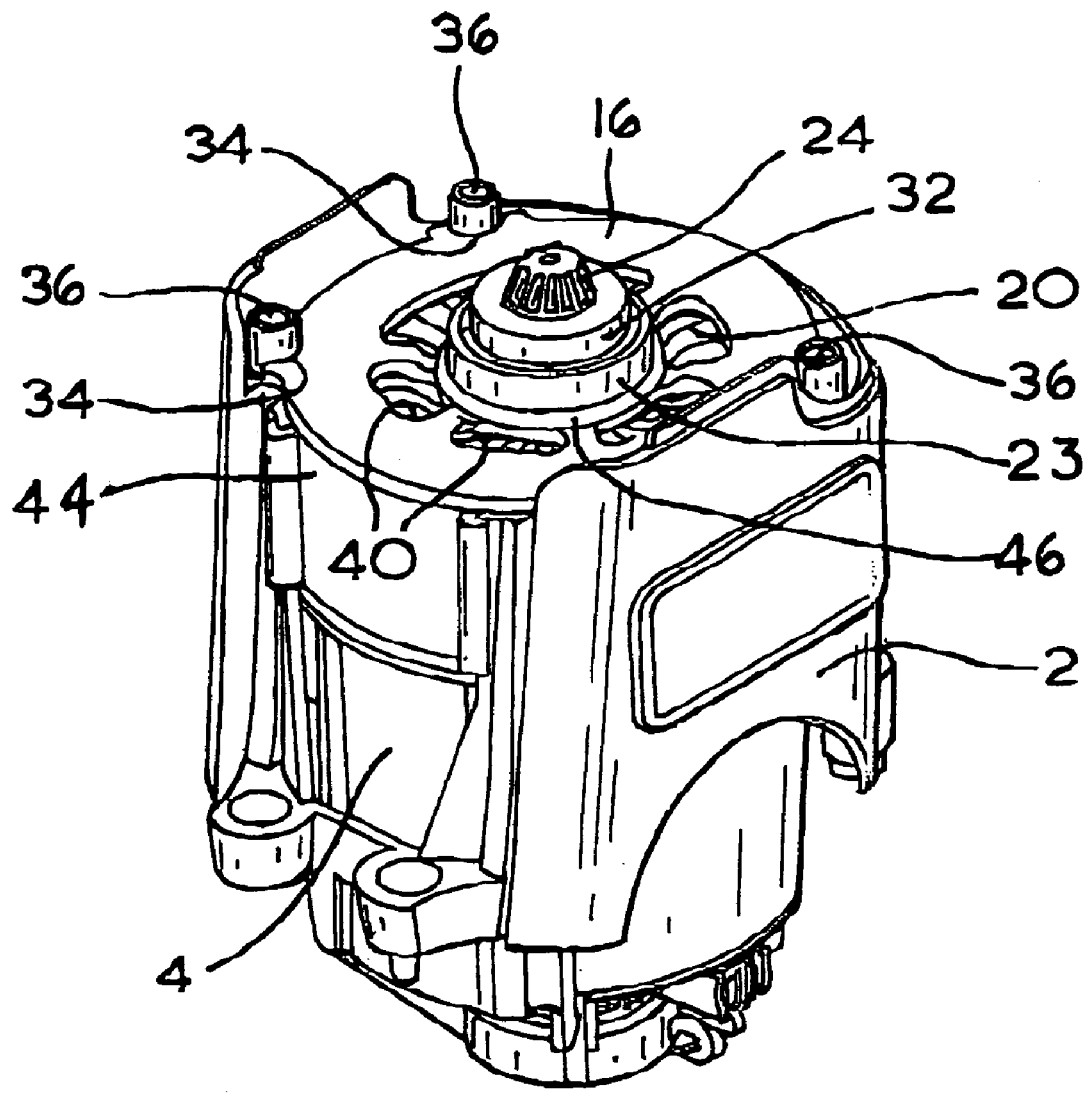
FIG. 3 shows a perspective view of the motor housing portion of the hammer of FIG. 1.

The hand held electrically powered hammer shown in FIGS. 1 to 3 has a housing comprising a motor housing portion (2) within which an electric motor (4) of the hammer is housed. The motor (4) is aligned with its longitudinal axis (5) perpendicular to the longitudinal axis (3) of a spindle (not shown) of the hammer. The present invention is equally applicable to a hammer in which the axis of the longitudinal motor is parallel, or at any other angle, to the longitudinal axis (3) of the spindle of the hammer.

A tool holder (26) is located at the forward end of the spindle. A tool or bit (not shown) can be non-rotatably and releasably fitted within the tool holder so as to allow limited reciprocation of the tool or bit with respect to the tool holder. The hammer has a rear handle (18) in which an on/off trigger (20) is located for actuating a switch for actuating power supply to the motor (4). The armature shaft (8) of the motor has a pinion (24) at its end closest to the spindle axis (3), which mates with a bevel gear (10) of an intermediate shaft (12). A wobble drive arrangement (14) is used for converting a rotary drive from the intermediate shaft (12) to a reciprocating drive of an air cushion hammering mechanism, as is known in the art, for generating repeated impacts on the rearward end of the tool or bit. The intermediate shaft may also transmit a rotary drive to the spindle and thereby to the tool or bit mounted within the spindle, as is known in the art. The intermediate shaft (12) and wobble drive arrangement (14) are housed in a metal gear casing (30). A mode change arrangement, actuated by a mode change knob (50), is provided for enabling the selective engagement of rotary drive to the spindle and/or selective actuation of the air cushion hammering mechanism so that the hammer can be operated in a drilling only mode, a hammering only mode and/or a combination rotary hammering mode, as is well known in the art.

Figure 4A:
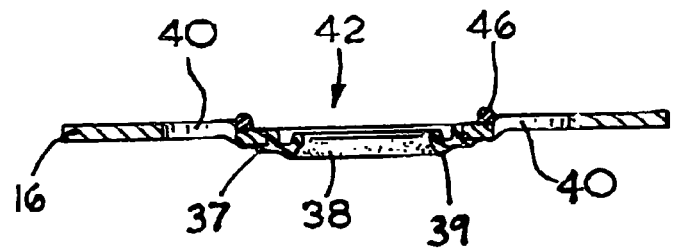
FIG. 4A shows a radial cross-section through the motor plate of the motor of the hammer of FIG. 1 with a directly moulded on O-ring and seal.
Figure 4B:
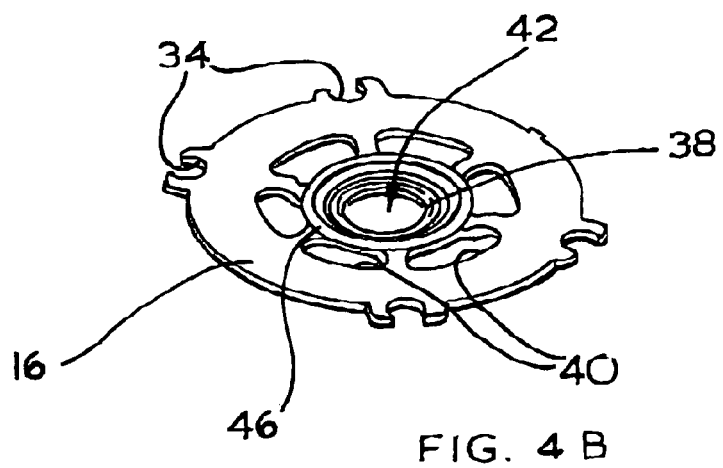
FIG. 4B shows a perspective view of the motor plate of FIG. 4A.

The motor (4) comprises an armature sub-assembly, which comprises an armature (6), armature shaft (8) with a pinion (24) formed at its upper end, a motor fan (20), armature upper and lower bearings (22), an upper sealing ring (32), a lower spacer ring (33) and a motor plate (16). The motor plate (16), shown in more detail in FIGS. 4A and 4B, is formed with a central through hole (42) through which an increased diameter portion of the armature shaft passes. The motor plate is axially secured on the armature shaft (8) by the forward bearing (22) which is press fitted onto the armature shaft (8) against a shoulder (28) formed thereon. The metal gear casing (30) is formed with an entrance (31) in the form of a circular through hole for receiving the motor pinion (24), upper sealing ring (32) and the upper bearing (22). The upper sealing ring (32) fits within a reduced diameter portion of the entrance through hole (31) in the gear casing (30) and rotates with the armature shaft, to provide sealing between the gear casing (30) and the motor (4). When the upper portion of the armature sub-assembly is fitted into the entrance (31), the upper bearing (22) is received with tight tolerances within an increased diameter portion of the entrance (31) in the gear casing (30) and the forward end of the forward bearing (22) abuts a shoulder formed by the reduced diameter portion of the entrance. The motor plate (16) is formed with a set of through holes (40) which form air inlets to the adjacent radial armature fan (20), which fan rotates with the armature shaft (8) so as to generate a cooling airflow. The motor plate (16) forms an upper wall of a chamber (21) for the fan (20).

Screw bosses (36) are formed in the motor housing portion (2) of the hammer housing. The motor plate (16) is formed with four recesses (34) which fit around the bosses (36). The lower side of the motor plate (16) abuts a forward edge of a motor casing portion (44). The gear casing (30) is formed with four screw receiving holes (not shown) which are aligned with the screw bosses (36) in the motor housing portion (2). Screws pass through the screw receiving holes in the gear casing, the screw bosses (36) in the motor housing portion (2) and thus through the recesses (34) in the motor plate (16). In this way the motor plate is axially fixed between the forward edge of the motor casing portion (44) and a rearward edge of the outer race of the forward bearing (22) and is rotationally fixed with respect to the hammer housing arrangement via the engagement of the bosses (36) in the recesses (34) to thereby fix the armature sub-assembly with respect to the gear casing (30) and the motor housing (2).

As shown in FIGS. 4A and 4B, according to a first embodiment of the present invention, a ring shaped resilient seal (38) is moulded directly onto the rim of the through hole (42) in the motor plate (16) and a resilient O-ring (46) is moulded directly onto the surface of the motor plate facing the gear casing (30).

The moulded seal (38) seals between the through hole (42) in the motor plate (16) and the rotatable armature shaft (8) in order to seal dust out of the gear casing (30). This is important because the cooling airflow for the motor (4), in which airflow some dust may be entrained, flows over the lower side of the seal (38) and through the inlets (40) formed in the motor plate (16) to the fan (20). The seal (38) has a radial cross-section as shown in FIG. 4A, with an L-shaped cross-sectioned portion (37) that abuts and is moulded to the inner surface of the central hole (42) and a part of the lower surface of the plate (16) surrounding the central hole (42) and a V-shaped cross-sectioned portion (39) which extends from the outer corner of the L-shaped portion. The end of the V-shaped portion (39) remote from the L-shaped portion (37) is urged as a result of the resilient characteristic of the material from which the seal (38) is made against the increased diameter portion of the armature shaft.

The inwardly facing face of the moulded O-ring (46) resiliently abuts the outer race (23) of the upper bearing (22) acting so as to prevent the outer race from rotating with the inner race of the bearing (22). When the motor (4) is fixed with respect to the gear casing (30), the surface of an increased diameter portion of the entrance (31) in the gear casing (30) receives the upper portion of the O-ring (46) and supports the O-ring (46) against the outer race (23) of the upper bearing (22).

Thus, according to the first embodiment of the present invention the three functions of fixing the armature sub-assembly with respect to the gear casing (30) and the motor (4), of sealing between the motor plate (16) and the armature shaft (8) and of fixing the outer race (23) of the upper bearing (22) of the armature shaft are achieved using a single component comprising the motor plate (16) with the resilient seal (38) and O-ring (46) moulded onto it.

Figure 5:
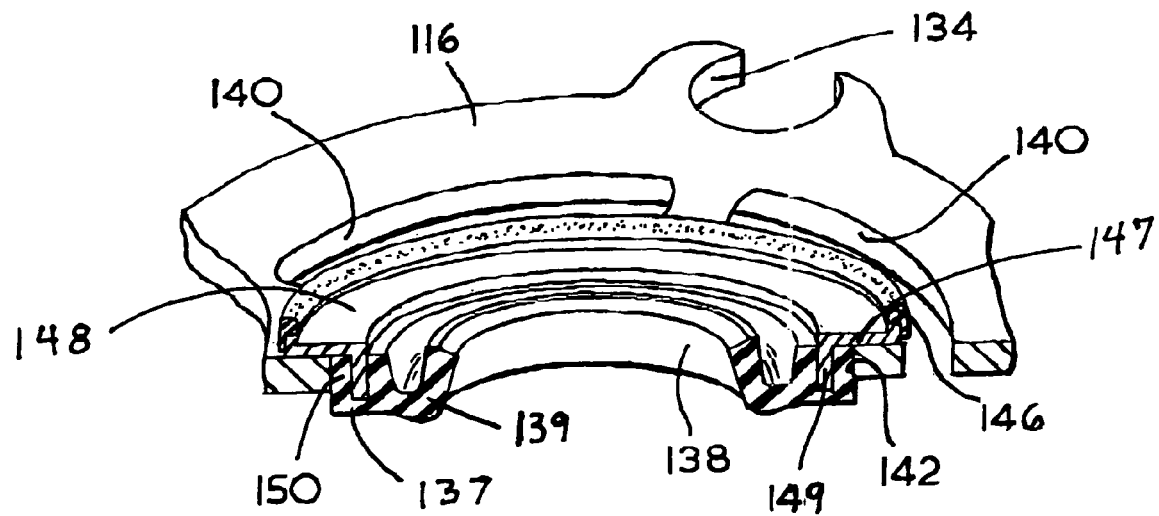
FIG. 5 shows a radial cross-section of a central portion of an alternative design of motor plate, to that shown in FIGS. 4A and 4B having a ring sub-assembly comprising a moulded on O-ring and seal.

An alternative to the motor plate (16) is shown in FIG. 5. The motor plate (116) is formed with a central through hole (142), inlet holes (140) to the fan (20) and boss receiving recesses (134) for receiving screw bosses (36). However, the resilient seal (138) and resilient O-ring (146) (equivalent to the seal (38) and O-ring (46) respectively in the FIGS. 4A and 4B embodiment) are moulded onto a metal ring (148). The metal ring has an L-shaped radial cross-section with a first radially extending portion (147) which (when the metal ring (148) is fitted to the motor plate (116)) abuts the upper face of the motor plate and with a second axially extending portion (149) which extends axially downwardly of the radially extending portion of the metal ring. The seal (138) has a U-shaped cross-sectioned fixing portion (137) which is moulded over the axially extending portion (149) of the metal ring (148) and a V-shaped cross-sectioned sealing portion (139) which extends from the inner corner of the U-shaped portion.

The metal ring (148) with the seal (138) and O-ring (146) is fitted into the central hole (142) of the motor plate (116), before the motor plate (116) is fitted over the armature shaft (8). A part (150) of the U-shaped portion (137) of the resilient seal (138) is wedged between the rim of the through hole (142) of the motor plate (116) and the axially extending portion (149) of the metal ring (148) and acts to provide a deformable releasable fixing between the metal ring (148) and the motor plate (116). The upper motor bearing (22) is press fit onto the upper end of the armature shaft (8) against the shoulder (28) to thereby trap the metal ring (148) between the motor plate (116) and the bearing (22) to form a permanent fixing of the metal ring (148) with respect to the motor plate (116). The O-ring (146) abuts the outer race of the bearing (22) to prevent its rotation. The motor plate (116) is fixed with respect to the gear casing (30) and the motor housing portion (2) in the same way as is described above in relation to the embodiments of FIGS. 4A and 4B.

The O-ring (46, 146) and the seal (38, 138) may be made of an elastomeric material. The motor plate (16, 116) and the metal ring (148) may be made of steel or stainless steel.

The invention claimed is:

1. A sub-assembly for a motor of a hand held electrically powered tool comprising an armature shaft having a first end at which a pinion is formed, a motor plate having a central opening mounted around the armature shaft adjacent said first end and a first armature shaft bearing located between the motor plate and the pinion, characterized in that a moulded on resilient sealing ring is located around the central opening though the motor plate for sealing between the motor plate and the armature shaft and a moulded on resilient O-ring is located on the face of the motor plate facing the bearing for engaging the outer race of said bearing; wherein the resilient sealing ring and the resilient O-ring are moulded onto a metal ring which metal ring fits within the central opening of the motor plate.

2. A sub-assembly according to claim 1 wherein the resilient sealing ring is moulded directly onto the motor plate.

3. A sub-assembly according to claim 1 wherein the resilient O-ring is moulded directly onto the motor plate.

4. a sub-assembly according to claim 1, additionally including a fan mounted on the armature shaft to rotate with the shaft, and wherein the motor plate is located adjacent the fan so that the plate forms part of a chamber for the fan and through holes are formed in the motor plate which act as inlets to the fan.

5. A hand held electrically powered tool, comprising:
a drive mechanism of the tool;
a gear casing for housing the drive mechanism, the gear casing including an entrance;
a motor including an armature shaft having a first end at which a pinion is formed for engaging the drive mechanism;
a motor plate having a central opening mounted around the armature shaft adjacent said first end;
an armature shaft bearing including an outer race and located between the motor plate and the pinion, and received in the entrance of the gear casing;
a resilient O-ring located on the motor plate and engaging the outer race of said bearing; and
a resilient sealing ring moulded onto the motor plate and located around the central opening through the motor plate for sealing between the motor plate and the armature shaft;
wherein the resilient sealing ring has a first portion which is moulded onto the motor plate and a second portion which depends from the first portion and forms a seal against the armature shaft.

6. A tool according to claim 5 wherein the resilient O-ring is moulded directly onto the motor plate.

7. A tool according to claim 5 wherein the motor is housed in a motor housing and the motor plate is sandwiched between the motor housing and the bearing when the motor is fixed with respect to the gear casing.

8. A tool according to claim 5 wherein fixing members, pass through receiving holes in the gear casing and the motor housing and through recesses in the motor plate for fixing the motor with respect to the gear casing.

9. A tool according to claim 5 wherein the first portion has an L-shaped radial cross-section and the second portion has a V-shaped radial cross-section and depends from the outside corner of the L-shaped portion.

10. A tool according to claim 1 wherein the motor plate is located adjacent a fan, which fan is mounted to rotate with the armature shaft, so that the plate forms part of a chamber for the fan and through holes are formed in the motor plate which act as inlets to the fan.

11. A tool according to claim 5 wherein the resilient O-ring is supported on its radially outer surface by a surface of the entrance to the gear casing.

12. A hand held electrically powered tool, comprising:
a drive mechanism of the tool;
a gear casing for housing the drive mechanism, the gear casing including an entrance;

a motor including an armature shaft having a first end at which a pinion is formed for engaging the drive mechanism;

a motor plate having a central opening mounted around the armature shaft adjacent said first end;

an armature shaft bearing including an outer race and located between the motor plate and the pinion, and received in the entrance of the gear casing;

a metal ring defining a hole and located within the central opening of the motor plate; and a resilient sealing ring moulded onto the metal ring and located around the hole through the metal ring for sealing between the metal ring and the armature shaft.

13. A tool according to claim 12 and further comprising a resilient O-ring moulded on the metal ring and engaging the outer race of the bearing.

14. A tool according to claim 13 wherein the metal ring has a radially outwardly extending portion and the resilient O-ring is moulded to a face of the radially extending portion.

15. A tool according to claim 12 wherein the metal ring has an axially extending portion and the resilient sealing ring includes a first portion moulded over the axially extending portion and a second portion which depends from the first portion and forms a seal against the armature shaft.

16. A tool according to claim 15 wherein the first portion of the resilient sealing ring has a U-shaped radial cross-section and the second portion has a V-shaped radial cross-section and depends from the radially inner corner of the U-shaped portion.

* * * * *